(12) United States Patent
Okada

(10) Patent No.: US 7,864,038 B2
(45) Date of Patent: Jan. 4, 2011

(54) ALARM ENGINEERING AIDING SYSTEM

(75) Inventor: Satoshi Okada, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 336 days.

(21) Appl. No.: 12/220,005

(22) Filed: Jul. 21, 2008

(65) Prior Publication Data
US 2009/0224905 A1 Sep. 10, 2009

(30) Foreign Application Priority Data
Jul. 19, 2007 (JP) .............................. 2007-188463

(51) Int. Cl.
G08B 25/00 (2006.01)
(52) U.S. Cl. .................. 340/525; 340/500; 340/505; 340/506; 340/511; 340/521; 340/532; 340/538; 340/679; 702/179; 702/182; 702/186; 702/188
(58) Field of Classification Search ............... 340/525, 340/521, 500, 505, 506, 511, 532, 538, 679; 702/182, 186, 188, 179
See application file for complete search history.

(56) References Cited

U.S. PATENT DOCUMENTS

| | | | | |
|---|---|---|---|---|
| 4,933,885 A | * | 6/1990 | Kato et al. | .............. 700/286 |
| 6,690,274 B1 | * | 2/2004 | Bristol | .................. 340/506 |
| 6,950,766 B2 | * | 9/2005 | Okamoto et al. | .............. 702/81 |
| 2003/0046027 A1 | * | 3/2003 | Kitamura et al. | ............ 702/182 |
| 2007/0172018 A1 | * | 7/2007 | Murayama et al. | .......... 376/245 |

FOREIGN PATENT DOCUMENTS

JP 2006-318147 11/2006

* cited by examiner

*Primary Examiner*—Tai T Nguyen
(74) *Attorney, Agent, or Firm*—Westerman, Hattori, Daniels & Adrian, LLP

(57) ABSTRACT

The present invention relates to an alarm engineering aiding system for aiding engineering of an alarm generated in a plant. There are provided an alarm generating scenario file in which types of pseudo alarms and generation timings are defined, a plant instrumentation information DB for storing instrumentation information of the plant, and a pseudo alarm generating section for generating the pseudo alarm based on the alarm generating scenario file, and adding instrumentation information of the plant while referring to the plant instrumentation information DB when the pseudo alarm is generated.

6 Claims, 4 Drawing Sheets

ALARM ENGINEERING AIDING SYSTEM

This application claims priority to Japanese Patent Application No. 2007-188463, filed Jul. 19, 2007, in the Japanese Patent Office. The Japanese Patent Application No. 2007-188463 is incorporated by reference in its entirety.

TECHNICAL FIELD

The present disclosure relates to an alarm engineering aiding system for aiding the engineering applied to check whether or not process/display of the alarm generated in the plant are made correctly, and the like.

RELATED ART

In the related art, when a large number of alarms are generated successively from the field equipments, the distributed control system (DCS), and the like, an alarm flood state that an alarm message monitoring screen is filled with alarm messages takes place. This alarm flood state becomes a cause of such a situation that the plant operator passes over an important alarm or makes an error of judgment.

Therefore, such an alarm management is applied that, even though a number of unnecessary alarms are generated, the operator is allowed to accept or reject the information and is informed of the necessary alarm only at an optimum timing. At this time, the engineering applied to process, display, etc. of the alarm is needed. For this purpose, when the engineering of the alarm is conducted, a means for checking whether or not the alarm engineering is carried out truly to give the intended result of this engineering is needed.

FIG. 4 is an explanatory view of an alarm engineering in the related art.

The DCS is constructed by a field control station (FCS) 1 for controlling the field equipment (not shown), an operation monitoring station (HIS) 10 for providing an operation interface to execute the operation monitoring of the FCS, and an engineering station (ENG) 20 for executing engineering functions such as application editing, download, test, etc. and doing maintenance. The function of the HIS 10 and the function of the ENG 20 may be installed into one PC or separate PCs.

An alarm message collecting section 11 receives the alarm or the event from the actual machines such as the field equipment, the FCS 1, and the like in the plant. An alarm processing section 12 applies addition of added value information, normalization, suppression, grouping, etc. to the received alarm or event. Here, the "addition of added value information" is a function of adding the supposed cause from which the alarm originated, the treatment to be taken, the information to be monitored together, etc. to the alarm or event. Also, the "normalization" is a process of removing the dialect or the irregularity of level from the collected alarms or events and is a function of executing the standardization of the notation methods, the leveling of a degree of importance of alarm, etc.

Also, the "suppression" is a function of deleting the alarms, of which the operator should not be informed, such as the alarm generated from the plant whose operation is halted, the follow-up alarm, etc. from the monitored objects. Also, the "grouping" is a function of deleting overlapping alarms, of which the operator should not be informed, when the same alarm is generated at the same time from plural systems.

An alarm displaying section 13 is a means for displaying the alarm or the event on a display 14 as a displaying section in such a format that the operator can deal easily with the alarm or the event, and executes filtering, shelving, load limit, etc. Here, the "filtering" is a function of filtering the messages while using identifiers attached originally to the alarm message (user name, plant hierarchical name, alarm type, alarm importance, etc.) and identifiers newly added (monitoring purpose of alarm, use of alarm, running mode to be monitored, etc.) as a key.

Also, the "shelving" is a function of retracting temporarily the alarms, which do not need monitoring on a priority basis, into another message display area prepared in advance such that the number of alarm messages to be displayed in a main message display area is reduced visually and thus the important alarm can be picked up easily without fail. Also, the "load limit" is a function of reducing the number of alarm messages to be displayed by applying automatically the previously designated filtering to lighten an operator's monitoring load when the alarm message occurs frequently.

The plant engineer sets the process on the alarm or event and specifies a display mode by using an alarm engineering section 23 via an inputting section 21. The data being set by the alarm engineering section 23 are saved in an alarm engineering DB 24 as a database (DB). The plant engineer checks the contents on a display 22 and carries out the engineering of the plant. For example, priority of the alarm, purpose of the alarm, importance, allowable time until a countermeasure is taken, etc. are saved in the alarm engineering DB 24.

The process made by the alarm processing section 12 and the display made by the alarm displaying section 13 are carried out while referring to the information in the alarm engineering DB 24.

[Patent Literature 1] Japanese Patent Application Publication No. 2006-318147

Up to now, a check of the alarm engineering was made by generating actually the alarm by using the actual machines or building up the specialized application used to generate a pseudo message in the FCS. For this reason, in order to generate the intended alarm, a lot of man-hours are required and also the expert knowledge is needed.

Also, there is no guarantee that all intended alarms could always be generated. Therefore, the plant engineer cannot check whether or not all alarm engineering are being conducted correctly.

SUMMARY

Exemplary embodiments of the present invention provide an alarm engineering aiding system that can to carry out an alarm test to check whether or not process/display of the alarm are made correctly, by generating a pseudo alarm.

Exemplary embodiments of the present invention is constructed as follows.

(1) An alarm engineering aiding system for aiding engineering of an alarm generated in a plant, includes an alarm generating scenario file in which types of pseudo alarms and generation timings are defined; a plant instrumentation information DB for storing instrumentation information of the plant; and a pseudo alarm generating section for generating the pseudo alarm based on the alarm generating scenario file, and adding instrumentation information of the plant while referring to the plant instrumentation information DB when the pseudo alarm is generated.

(2) The alarm engineering aiding system set forth in (1) further includes an alarm engineering section for setting process of the alarm generated in the plant and contents to be displayed; an alarm engineering DB for storing data being set by the alarm engineering section; and an alarm managing section for managing the alarm generated in the plant, while referring to the alarm engineering DB; wherein the pseudo alarm of the pseudo alarm generating section is added to the alarm managing section.

(3) In the alarm engineering aiding system set forth in (2), the alarm managing section has an alarm processing section for executing the process of the alarm, and diagnoses whether or not the process applied to the alarm is carried out correctly, based on a result of the pseudo alarm processed by the alarm processing section.

(4) In the alarm engineering aiding system set forth in (2) or (3), the alarm managing section has an alarm displaying section for controlling a display of the alarm, and diagnoses whether or not the display of the alarm is controlled correctly, based on a display result of the pseudo alarm on the alarm displaying section.

(5) In the alarm engineering aiding system set forth in to any one of (1) to (4), the pseudo alarm generating section is constructed to choose and execute the process in the alarm generating scenario file step by step.

(6) In the alarm engineering aiding system set forth in to any one of (1) to (5), the pseudo alarm generating section is constructed to hold a plurality of alarm generating scenario files and choose the file to be used from a plurality of alarm generating scenario files.

(7) In the alarm engineering aiding system set forth in to any one of (1) to (6), the plant instrumentation information DB extracts instrumentation information of the plant from an actual machine environment.

According to the present invention, following advantages can be given.

Since an alarm test environment for generating an alarm in a pseudo fashion is provided, it can be checked whether or not the alarm engineering is being carried out correctly.

Other features and advantages may be apparent from the following detailed description, the accompanying drawings and the claims.

DETAILED DESCRIPTION

The present invention will be explained in detail with reference to the drawings hereinafter.

Figure 1:
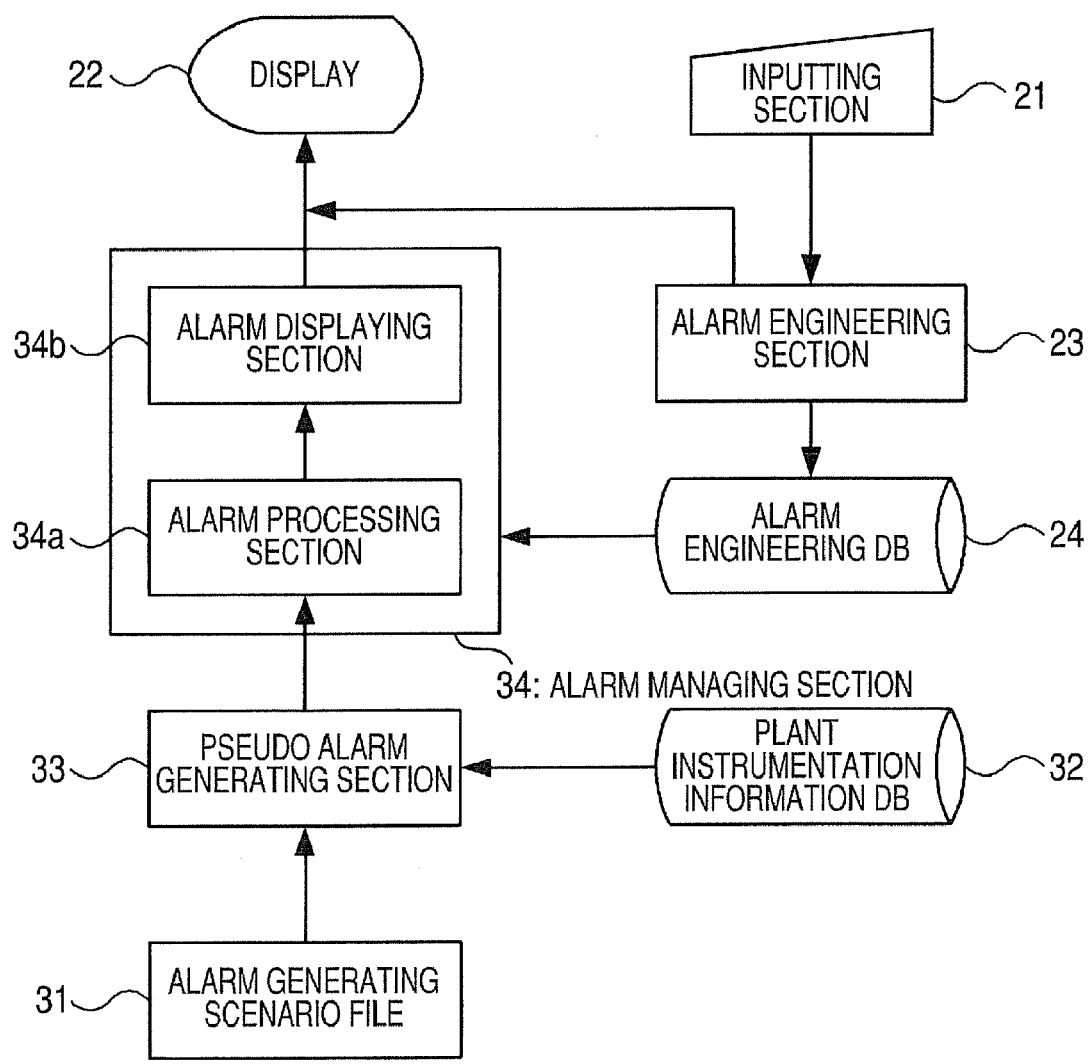
FIG. 1 is a configurative view showing an embodiment of the present invention.

FIG. 1 is a configurative view showing an embodiment of the present invention. The same reference symbols are affixed to the same constituent elements in the foregoing figure. Hereinafter, it will be explained how an alarm test to check whether or not the engineering applied to process/display an alarm is being handled correctly is carried out.

An alarm generating scenario file 31 is a file that defines what pseudo alarm for use in test should be generated at what timing. This file is prepared before the alarm test is carried out in advance. Also, a plurality of files can be provided in response to the test contents in unit of file.

A plant instrumentation information DB 32 stores instrumentation information of the plant. Here, the "instrumentation information of the plant" are information about tags of functional blocks that perform actually the PID control in the FCS, information indicating by which hardware the plant is constructed, and the like.

The instrumentation information of the plant may be set by the manual input, or may be captured from other DB. Also, the instrumentation information of the plant may be extracted from an actual machine environment.

A pseudo alarm generating section 33 generates the pseudo alarm based on the alarm generating scenario file 31, and adds the instrumentation information of the plant by referring to the plant instrumentation information DB 32 when the pseudo alarm is generated.

Also, the pseudo alarm generating section 33 generates the pseudo alarm based on the alarm generating scenario file 31, and injects the pseudo alarm into an alarm managing section 34. For example, "Generate a process alarm HH of FIC100" is described in the alarm generating scenario file 31, and information about "a degree of importance of the HH alarm of FIC100", "which location of which FCS the FIC100 is located", etc., which are the data necessary for the alarm test, are described in the plant instrumentation information DB 32. The pseudo alarm generating section 33 generates the pseudo alarm by correlating the alarm generating scenario file 31 with the information in the plant instrumentation information DB 32.

The alarm managing section 34 consists of an alarm processing section 34a for executing the process of the alarm, and an alarm displaying section 34b for controlling the display of the alarm. The alarm managing section 34 performs management of the alarm while referring to the information in the alarm engineering DB 24.

Here, the alarm managing section 34 is provided in the alarm test environment in a pseudo fashion, and is a function corresponding to the actual alarm managing section (the alarm processing section 12 and the alarm displaying section 13 in FIG. 1).

The alarm processing section 34a is a function equivalent to the alarm processing section 12 in FIG. 1 except that this alarm processing section operates even in the alarm test environment. This alarm processing section 34a applies addition of added value information, normalization, suppression, grouping, etc. to the received alarm or event.

The alarm displaying section 34b is a function equivalent to the alarm displaying section 13 in FIG. 1 except that this alarm displaying section operates even in the alarm test environment. This alarm displaying section 34b is a means for displaying the alarm or the event on a display 22 as a displaying section in such a format that the operator can deal easily with the alarm or the event, and executes filtering, shelving, load limit, etc.

In this manner, when the pseudo alarm is injected into the alarm managing section 34 on the alarm test environment to check the process/display results yielded by the pseudo alarm, a diagnosis to check whether or not process/display are made correctly in response to the pseudo alarm can be conducted.

Figure 2:
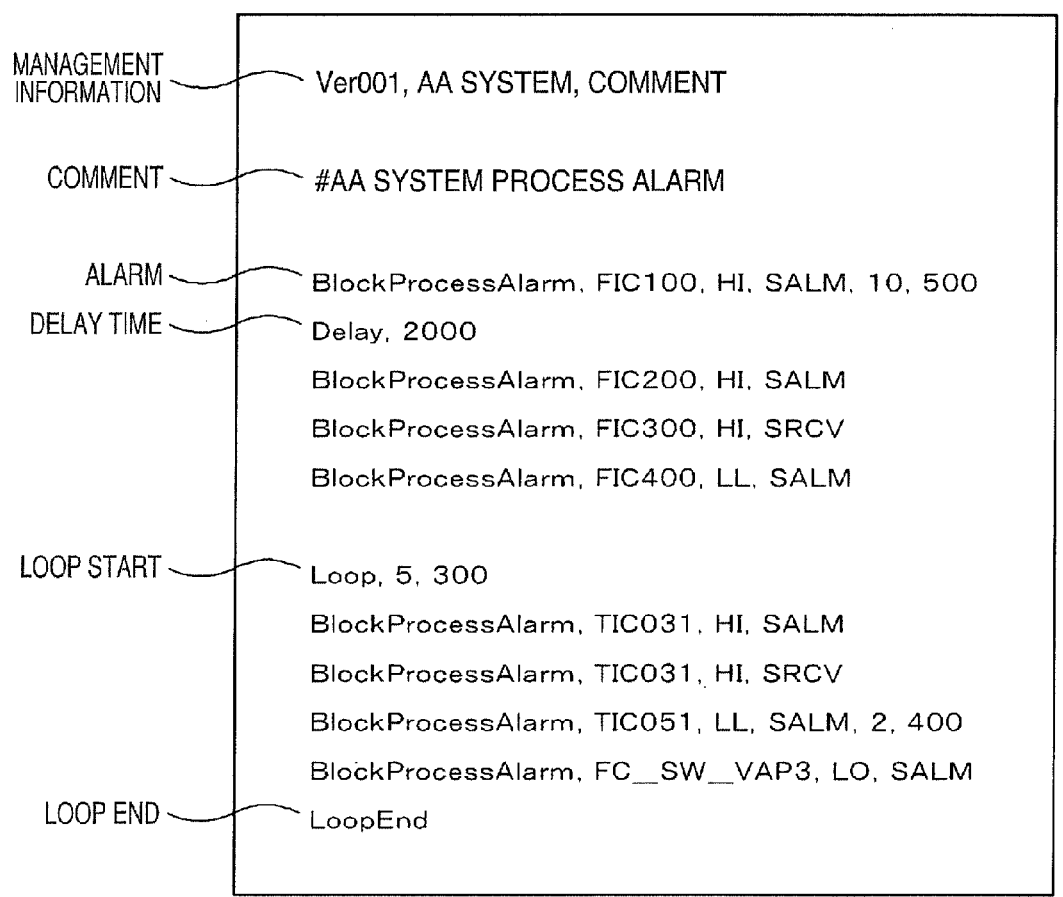
FIG. 2 is a view showing a display example of an alarm generating scenario file of the present invention.

FIG. 2 shows a display example of an alarm generating scenario file of the present invention.

In this alarm generating scenario file, such an example is illustrated that one process alarm is generated, then three types of process alarms are generated after 2000 msec have passed, and then four types of process alarms are generated five times repeatedly every 300 msec.

Figure 3:
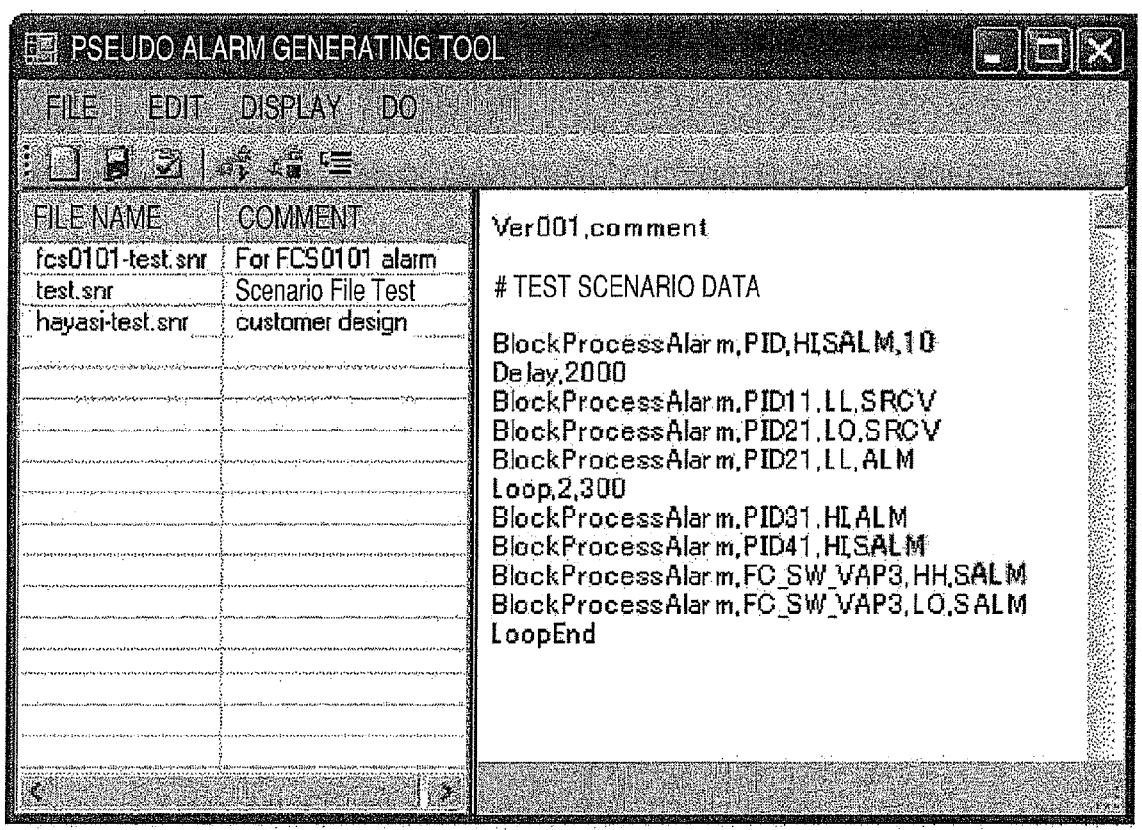
FIG. 3 is a view showing a concrete example of a pseudo alarm generating section of the present invention.
Figure 4:
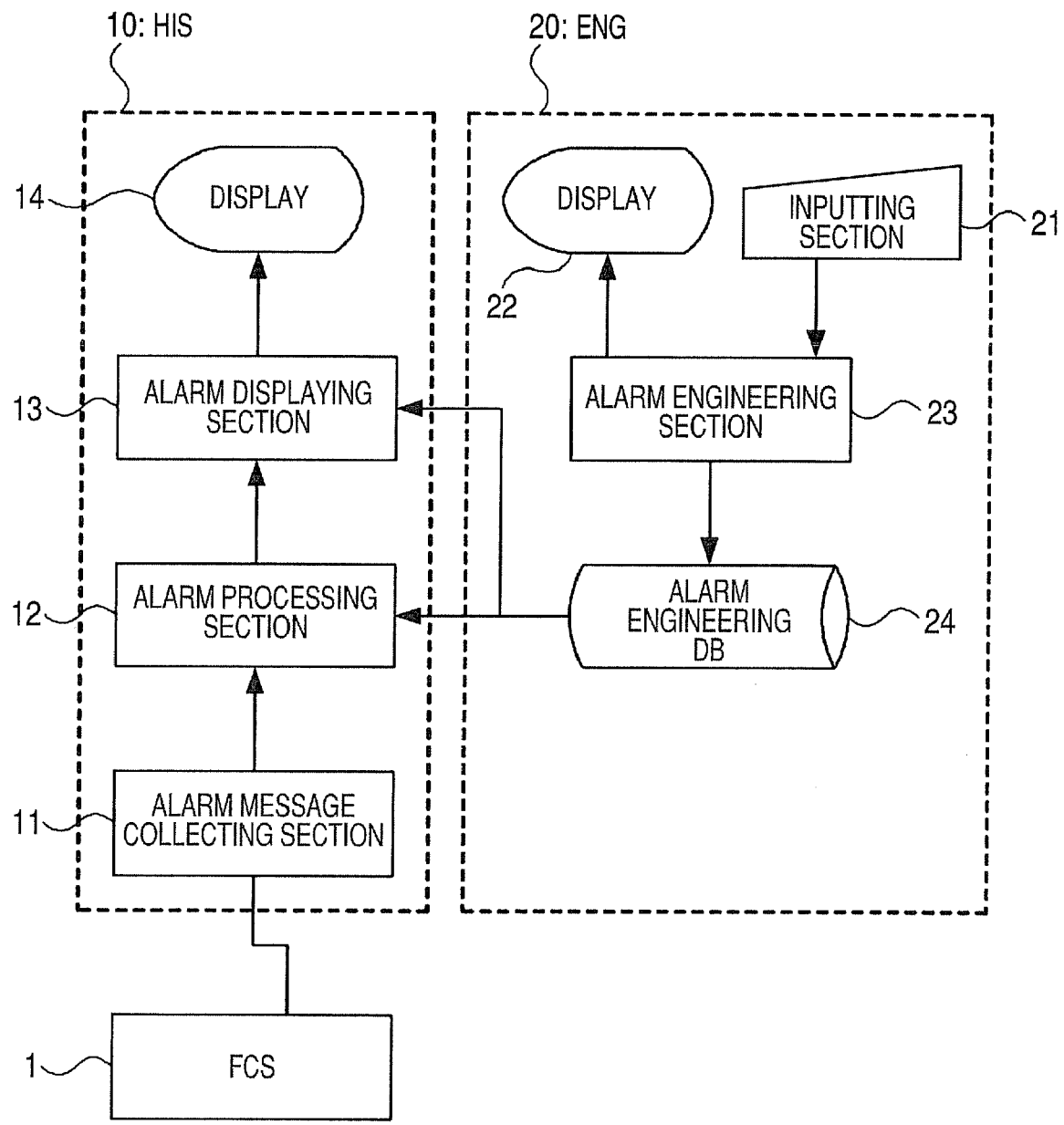
FIG. 4 is an explanatory view of an alarm engineering in the related art.

FIG. 3 is a view showing a concrete example of the pseudo alarm generating section of the present invention. FIG. 3 shows a pseudo alarm generating tool as a concrete example of the pseudo alarm generating section 33 in FIG. 1.

The pseudo alarm generating tool can handle a plurality of alarm generating scenario files. File names of respective scenario files and comments corresponding to these files are displayed in the left window. When the plant operator chooses the scenario file name to be used from a plurality of scenario files by using a mouse, or the like, the contents of the chosen scenario file are displayed in the right window.

The process of the alarm generating scenario file can be executed automatically in a full range in accordance with the described contents, or can be executed step by step. In this case, when the contents of the scenario file is chosen by using a mouse, or the like, the process given on the chosen row is carried out. The plant engineer can execute the control to generate the pseudo alarm, stop temporarily the pseudo alarm, or the like by using this pseudo alarm generating tool.

In this manner, the information are managed separately in the alarm generating scenario file and the plant instrumentation information, and the pseudo alarm is generated by synthesizing these information. Therefore, a wide variety of alarms can be produced. The validity of the alarm engineering can be checked, or the configuration check can be executed without omission.

Also, when the alarm is generated actually, the operator must take any countermeasure against such alarm. Therefore, the operator can undergo the training in the alarm generation by generating the pseudo alarm.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An alarm engineering aiding system for aiding engineering of an alarm generated in a plant, comprising:

an alarm generating scenario file in which types of pseudo alarms and generation timings are defined;

an alarm engineering section for setting process of the alarm generated in the plant and contents to be displayed;

an alarm engineering DB for storing data being set by the alarm engineering section; an alarm managing section for managing the alarm generated in the plant, while referring to the alarm engineering DB;

a plant instrumentation information DB for storing instrumentation information of the plant; and a pseudo alarm generating section for generating the pseudo alarm based on the alarm generating scenario file, and adding instrumentation information of the plant while referring to the plant instrumentation information DB when the pseudo alarm is generated; wherein the pseudo alarm of the pseudo alarm generating section is added to the alarm managing section.

2. An alarm engineering aiding system, according to claim 1, wherein the alarm managing section has an alarm processing section for executing the process of the alarm, and diagnoses whether or not the process applied to the alarm is carried out correctly, based on a result of the pseudo alarm processed by the alarm processing section.

3. An alarm engineering aiding system, according to claim 1, wherein the alarm managing section has an alarm displaying section for controlling a display of the alarm, and diagnoses whether or not the display of the alarm is controlled correctly, based on a display result of the pseudo alarm on the alarm displaying section.

4. An alarm engineering aiding system, according to claim 1, wherein the pseudo alarm generating section is constructed to choose and execute the process in the alarm generating scenario file step by step.

5. An alarm engineering aiding system, according to claim 1, wherein the pseudo alarm generating section is constructed to hold a plurality of alarm generating scenario files and choose the file to be used from a plurality of alarm generating scenario files.

6. An alarm engineering aiding system, according to claim 1, wherein the plant instrumentation information DB extracts instrumentation information of the plant from an actual machine environment.

* * * * *